Nov. 17, 1953     W. H. TANKE     2,659,291

REVERSIBLE DISK ATTACHMENT FOR AGRICULTURAL IMPLEMENTS

Filed Aug. 11, 1949

Inventor
Willard H. Tanke
by James D. Coffee
Attorney

Patented Nov. 17, 1953

2,659,291

UNITED STATES PATENT OFFICE 2,659,291

REVERSIBLE DISK ATTACHMENT FOR AGRICULTURAL IMPLEMENTS

Willard H. Tanke, La Crosse, Wis., assignor to Allis-Chalmers Manufacturing Company, Milwaukee, Wis., a corporation of Delaware Application August 11, 1949, Serial No. 109,724

6 Claims. (Cl. 97—217)

1

This invention relates generally to agricultural implements and is more particularly concerned with the improvement of a rotary disk attachment for cultivators or other ground working implements.

In the cultivation of row crops it is frequently most advantageous to use rotatable soil penetrating disks in place of the conventional shovel or sweep, particularly when either a barring off or hilling operation is required. Perhaps the most important cultivation is the barring off operation, since it destroys the weeds close to the crop row before the root system of the crop has spread sufficient to prevent close cultivation. And since the soil is frequently crusted around the plant care must be taken so that the plant is not uprooted in the process. Consequently, it has been found most satisfactory to use rolling disks in lieu of shovels so that the crust is broken along a line away from the plants and the plants are not disturbed. For this work the cultivator shovels which are normally positioned to travel immediately adjacent the plant row are replaced by concave-convex disks with the concave side facing away from the plants in order to throw the loosened soil into the space between plant rows. And in placing the disks on the cultivator it is desirable to have the supporting shank thereof positioned on the concave side of the disk in order that each pair of disks may be closely positioned with respect to each other.

After the plants are larger and stronger it is desirable to again use disks for hilling. Primarily this operation involves replacing the soil previously moved from the row to thereby cover up and smother any weeds which may have come up around the plants. This is accomplished by again replacing the shovels adjacent the plant rows with rolling disks, but in this instance the concave portion of the disk is faced toward the row to direct the soil toward the plants. And, in hilling it is desirable to have the disk supporting shank positioned on the outer or convex side of the disk in order not to interfere with the throwing of the dirt and in order to avoid gathering trash which may be moved by action of the disk.

Therefore, it is a primary object of the present invention to provide a rotary disk attachment having parts constructed and arranged in a novel manner affording selective facing of the disk relative to its supporting member with the disk also positionable on either of two oppositely facing sides of the supporting member.

And accordingly the present invention may be considered as comprising the various constructions and combinations as hereinafter pointed out in the description and claims, reference being had to the accompanying drawings illustrating but one embodiment of the invention and in which:

Figure 1:
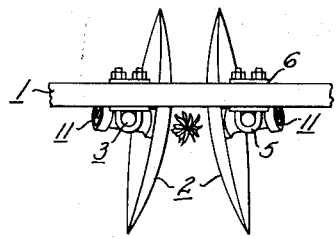
Fig. 1 is a plan view of a pair of disks embodying the present invention and mounted on a tool bar in a manner affording movement of soil away from the plants.
Figure 2:
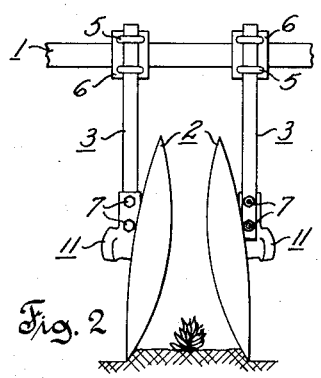
Fig. 2 is a rear elevation of the structure shown in Fig. 1.
Figure 5:
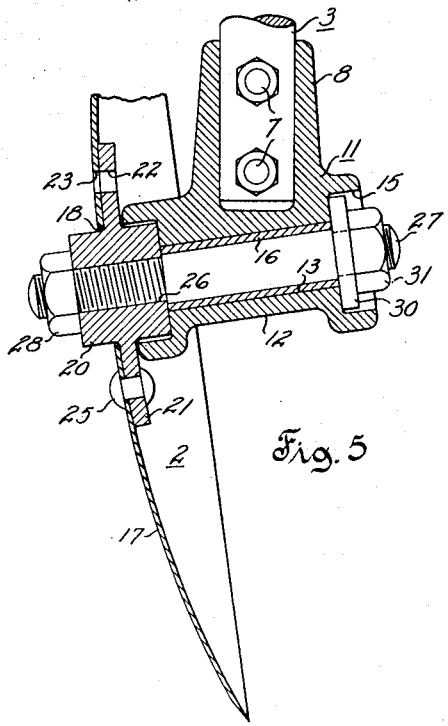
Fig. 5 is an enlarged partial view of a disk and its supporting structure with parts thereof broken away or shown in section for sake of clarity.

Having reference particularly to Figs. 1, 2 and 5 it will be noted that apparatus embodying the present invention comprises a tool bar 1 mounted in any conventional manner on a mobile supporting unit (not shown), a pair of disks 2, and supporting standards 3 rotatably mounting the disks and attached at their upper end portion to tool bar 1 by means of U-bolts 5 and clamping plates 6.

The lower portion of standard 3 is fixed, preferably in a detachable manner as by bolts 7, to a vertically extending portion 8 of a bearing housing 11 and this housing also includes an elongated part 12 extending crosswise of said housing with the longitudinal axis thereof disposed in oblique relation to the longitudinal axis of standard 3. Transverse housing portion 12 includes a cylindrical bore 13 lengthwise therethrough which terminates at its outer end portions in larger cylindrical recesses 15. A bushing or the like 16 is disposed within bore 13 between the cylindrical recesses 15.

Disk 2 comprises a ground engaging circular blade portion 17 having a concave-convex configuration with a coaxial circular opening 18 therethrough affording means for receiving a hub 20 in fixed relation thereto. Hub 20 includes a circular flange portion 21 having a series of circumferentially spaced openings 22 along its periphery for alignment with similarly positioned openings 23 near the center of disk portion 17 and the hub is secured to the disk by any suitable means such as rivets 25.

The center portion of hub 20 has a threaded opening 26 therethrough and when either end of hub 20 is placed within one of the recessed portions 15 of housing 11 this opening is aligned with the opening through bushing 16. Disk 2 is then rotatably fixed in supported relation to housing 11 by means of an axle 27 carried by bushing 16 and having reduced threaded end portions. One end of axle 27 is screwed through hub opening 26 and a nut 28 placed on the projecting portion to prevent relative axial movement therebetween and the other end of axle 27 has positioned thereon a washer 30 and a nut 31 to complete the rotatable axially fixed connection between the disk and the bearing housing.

It will be noted (Fig. 5) that hub 20 projects beyond opposite sides of flange portion 21 a sufficient distance to permit the positioning of the hub with either end thereof in bearing recess 15 and, furthermore, the hub may be selectively placed in either of the two recessed portions 15. Consequently, the disk may be reversed either with respect to itself or with respect to housing 11. And, in this connection, the predetermined angle between standard 3 and bearing housing portion 12 is selected so that disk blade 17 assumes the proper vertical working angle with respect to the ground when standard 3 is positioned normal to the ground and disk 2 is mounted on the bearing housing in any of the positions shown in Figs. 1 to 4, inclusive.

In order to provide sufficient clearance between disk blade 17 and standard 3, when these parts are positioned as shown in Fig. 5, the standard receiving portion 8 of bearing 11 has been formed in off-center or nonsymmetrical relation to transverse portion 12. The design shown (Fig. 5) does not afford similar clearance when the disk is positioned on the opposite end of housing portion 12 with the concave side of the blade facing the standard since such position is not essential to complete utility of the present invention. The latter mentioned position places the disk approximately normal to the ground and, therefore, very little soil would be thrown by disk action in this position. When it becomes desirable to merely break the soil along a line and not throw any soil, this can be accomplished by placing the disk on the end of transverse part 12 most remote from standard receiving portion 8 with the convex side of the blade facing the standard. In this position the blade will be approximately normal to the ground and will cut into the soil without affording any appreciable earth movement.

Figure 6:
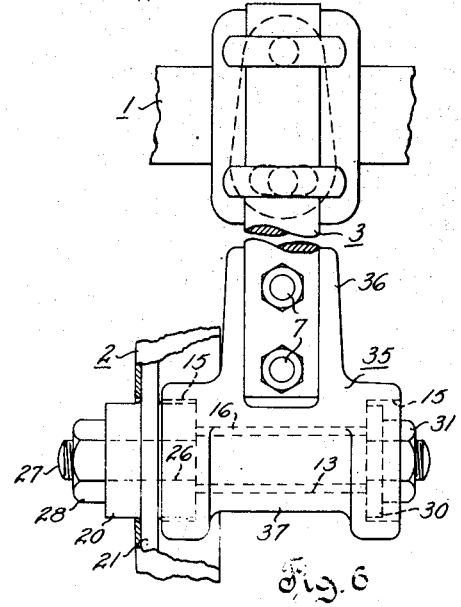
Fig. 6 is an illustration of a modified form of the present invention.

A modified form of the invention is illustrated in Fig. 6 wherein the bearing housing 35 is essentially T-shaped and symmetrical with respect to the longitudinal axis of the standard receiving portion 36. This construction permits hub 20 of the disk to be placed on either end of the transverse housing portion 37 with either side of the blade facing the standard. However, in order to afford an angling of the disk relative to the ground there must also be provided some type of adjustable connecting means affording angling of the standard relative to tool bar 1. The particular connection shown in Fig. 6 is described in detail in a pending application, W. G. Charley, Serial No. 103,298, filed July 6, 1949, and, since this structure is not an essential part of the present invention, a detailed description herein is believed unnecessary.

The use of the apparatus shown in Figs. 1 to 5 will now be described with respect to its application to the cultivation of row crops in order to illustrate the utility of the present invention. As shown in Figs. 1 and 2 the disks are positioned for barring off the plants at an early stage of their growth. This operation involves the cutting of the soil crust along a line which is parallel to the plant row and laterally spaced therefrom a distance sufficient to avoid destroying the plant roots. The disk blade 17 is positioned with the concave side thereof facing the supporting standard and with the blade angled both with respect to the ground and the direction of travel in order that the earth on the outside of the line of cut may be loosened and thrown away from the plants. The soil area thus loosened may then be further cultivated by shovels positioned to the rear and offset laterally outward with respect to the disk blade in a conventional manner (not shown).

And for this barring off operation it may be seen in Figs. 1 and 2 (direction of travel toward the top of the sheet) that the right hand disk is positioned as shown in Fig. 5 with the disk mounted on the end of the bearing housing most remote from standard receiving portion 8 and the concave side of the blade facing the standard. It will also be noted, particularly in Fig. 1, that the tool shank or standard 5 has been rotated about its longitudinal axis to angle blade 17 somewhat with respect to the direction of travel to thereby effect a soil turning action of the disk. The left hand disk is positioned on the bearing housing in exactly the same manner but the housing is reversed, that is, rotated 180° from the position shown in Fig. 5, in order to have the concave side of the blade face in a direction opposite to that of the right hand disk.

Also, in the barring off position it will be noted that bearing housing 11 is on the side of the respective disks facing away from the plants. This is particularly convenient in that it permits very close spacing of disks for cultivation of small plants. It is also helpful in other cultivating operations, for example, in cross row blocking of beets when there is a good stand of beets in the row.

Figure 3:
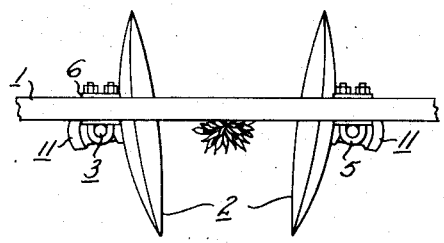
Fig. 3 is a plan view of disks mounted on a tool bar in a manner such that soil is thrown toward the plants by the moving disks.
Figure 4:
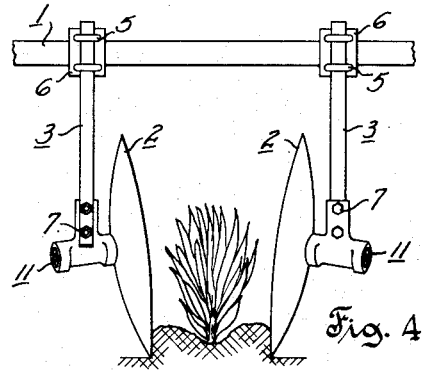
Fig. 4 is a rear elevation of the disks shown in Fig. 3.

Once the plants have attained sufficient growth it becomes desirable to build the soil up around the base of the plants and the disk blades then perform the hilling operation shown in Figs. 3 and 4. For this operation the right hand disk blade is positioned on the end of bearing housing 11 nearest standard receiving portion 8 with the convex side facing the standard and the concave side facing the plant row at angle with respect to the direction of travel. The left hand disk is similarly positioned with respect to the bearing housing but the two parts are rotated 180° from the position just described in order that the concave surface of the blade may face the plant row. It will be noted that in this case the bearing housing is on the side of the blade opposite to that contacting the soil. This is desirable since in hilling it may be necessary to throw a considerable quantity of dirt and undoubtedly some of it would get into the bearing and cause excessive wear or even breakage of parts if the bearing was disposed in the path of the moving dirt. Then too, there is less likelihood of the bearing housing collecting trash overturned during the hilling operation when so disposed.

And although shown and described as applied to a cultivating disk it is not intended to thereby limit the invention to the constructions and combinations shown, since other modifications and applications within the scope of the appended claims may readily occur to those skilled in the art.

It is claimed and desired to secure by Letters Patent:

1. In an implement, a tool supporting standard having an end thereof provided with an elongated part extending crosswise of said standard, said part having a bore extending longitudinally therethrough and presenting similar plane end bearing surfaces surrounding opposite ends of said bore, a rotary tool comprising a hub portion presenting similar oppositely facing plane end surfaces complementary to said oppositely facing end bearing surfaces of said part, said hub having an axial bore therethrough in normal relation to its said end surfaces and alignable with the bore in said part, and means including an element insertable through said bores for detachably securing said tool to said part for rotation relative thereto with one of said hub end surfaces rotatably bearing against a supporting surface comprising the selected one of either of said part end surfaces.

2. In an agricultural implement, a tool supporting standard having an end thereof provided with an elongated part extending crosswise of said standard, said part having a bore extending longitudinally therethrough and presenting similar plane end bearing surfaces surrounding opposite ends of said bore, said standard having its longitudinal axis disposed in oblique relation to the longitudinal axis of said bore, a concave-convex disk including a hub portion presenting oppositely facing similar plane end surfaces complementary to said oppositely facing end bearing surfaces of said part, said hub having an axial bore therethrough in normal relation to its said end surfaces and alignable with the bore in said part, and means including an element insertable through said bores for detachably securing said disk to said part for rotation relative thereto with one of said hub end surfaces rotatably bearing against a supporting surface comprising the selected one of either of said part end surfaces.

3. In an implement, a tool supporting standard having an end thereof provided with an elongated part extending crosswise of said standard in non-symmetrical relation to the adjoining end thereof, said part having a bore extending longitudinally therethrough and presenting similar plane end bearing surfaces surrounding opposite ends of said bore, a concave-convex disk comprising a hub portion presenting similar oppositely facing plane end surfaces complementary to said oppositely facing end bearing surfaces of said part, said hub having an axial bore therethrough in normal relation to its said end surfaces and alignable with said bore in said part, and means including an element insertable through said bores for detachably securing said disk to said part for rotation relative thereto whereby said disk may be selectively positioned with the end surface of said hub on the convex side of said disk rotatably bearing against a selected one of said plane end bearing surfaces of said part or with the end surface of said hub on the concave side of said disk rotatably bearing against the plane end bearing surface of said part most remote from the adjacent end of said standard.

4. In an implement, a generally vertical tool supporting standard having a lower portion diverging laterally downward relative to the longitudinal axis of its upper portion, said lower portion having a bore extending longitudinally therethrough with the axis thereof forming an acute angle with the longitudinal axis of said upper portion, said lower portion presenting similar plane end bearing surfaces surrounding opposite ends of said bore, a concave-convex disk including a hub portion presenting similar oppositely facing plane end surfaces complementary to said oppositely facing end bearing surfaces of said lower portion, said hub having an axial bore therethrough in normal relation to its said end surfaces and alignable with said bore in said lower portion, and means including an element insertable through said bores for detachably securing said disk to said lower portion for rotation relative thereto with the convex side of the disk opposing the end bearing nearest the acute angle formed between said upper and lower portions or with a selected side of said disk opposing the end bearing most remote from said acute angle.

5. In an implement, a generally vertical tool supporting standard having its lower portion laterally offset in nonsymmetrical relation to the longitudinal axis of its upper portion, said lower portion having a bore extending longitudinally therethrough with the axis thereof forming an acute angle with the longitudinal axis of said upper portion, and said lower portion presenting similar plane end bearing surfaces surrounding opposite ends of said bore, a concave-convex disk including a hub portion presenting similar oppositely facing plane end surfaces complementary to said oppositely facing plane end bearing surfaces of said lower portion, said hub having an axial bore therethrough in normal relation to its said end surfaces and alignable with said bore in said lower portion, and means including an element insertable through said bores for detachably securing said disk to said lower portion for rotation relative thereto with the convex side of the disk opposing the end bearing nearest the acute angle formed between said upper and lower portions or with a selected side of said disk opposing the end bearing most remote from said acute angle.

6. In an implement, a generally vertical tool supporting standard having its lower end provided with an elongated part extending crosswise thereof, said part having a bore extending longitudinally therethrough with the axis thereof forming an acute angle with the longitudinal axis of said standard, and said part presenting similar recessed circular plane end bearing surface portions surrounding opposite ends of said bore, a cylindrical bearing within said bore in coaxial relation thereto, a concave-convex disk including a hub portion presenting similar oppositely facing plane end surfaces complementary to said oppositely facing plane end bearing surfaces of said part, said hub having an axial bore therethrough in normal relation to its said end surfaces and alignable with said bore in said part, and means including an element insertable through said aligned bores for detachably securing said disk to said part for rotation relative thereto with the convex side of the disk opposing the end bearing nearest the acute angle formed between said standard and said part or with a selected side of said disk opposing the end bearing most remote from said acute angle.

WILLARD H. TANKE.

References Cited in the file of this patent

UNITED STATES PATENTS

| Number | Name | Date |
| --- | --- | --- |
| 486,776 | Haines et al. | Nov. 22, 1892 |
| 563,515 | Spalding et al. | July 7, 1896 |
| 1,077,288 | McKee | Nov. 4, 1913 |